United States Patent
Primessnig (10) Patent No.: US 9,604,362 B2
(45) Date of Patent: Mar. 28, 2017

(54) METHOD AND APPARATUS FOR FAILURE HANDLING OF A ROBOT

(71) Applicant: Infineon Technologies AG, Neubiberg (DE)

(72) Inventor: Michael Primessnig, Bad Kleinkirchheim (AT)

(73) Assignee: Infineon Technologies AG, Neubiberg (DE)

( * ) Notice: Subject to any disclaimer, the term of this patent is extended or adjusted under 35 U.S.C. 154(b) by 196 days.

(21) Appl. No.: 14/092,711

(22) Filed: Nov. 27, 2013

(65) Prior Publication Data
US 2015/0148958 A1    May 28, 2015

(51) Int. Cl.
*B25J 9/16* (2006.01)

(52) U.S. Cl.
CPC ... *B25J 9/1676* (2013.01); *G05B 2219/40164* (2013.01); *G05B 2219/40373* (2013.01); *G05B 2219/50108* (2013.01)

(58) Field of Classification Search
CPC ........... G05B 2219/40164; G05B 2219/40373; G05B 2219/50108; B25J 9/1676
See application file for complete search history.

(56) References Cited

U.S. PATENT DOCUMENTS

| | | | |
|---|---|---|---|
| 5,280,431 A * | 1/1994 | Summerville et al. | 701/24 |
| 7,627,394 B2 * | 12/2009 | Volcic | B25J 9/1664 318/567 |
| 7,774,099 B2 | 8/2010 | Kobayashi et al. | |
| 8,965,561 B2 * | 2/2015 | Jacobus et al. | 700/216 |
| 2004/0068348 A1 | 4/2004 | Jager | |
| 2006/0049939 A1 | 3/2006 | Haberer et al. | |
| 2007/0142967 A1 | 6/2007 | Volcic et al. | |
| 2008/0091301 A1 * | 4/2008 | Brantmark et al. | 700/245 |
| 2010/0168914 A1 | 7/2010 | Kang et al. | |

FOREIGN PATENT DOCUMENTS

| | | |
|---|---|---|
| CN | 1715010 A | 1/2006 |
| CN | 1990197 A | 7/2007 |
| DE | 102004026488 A1 | 12/2005 |
| DE | 102004043514 A1 | 3/2006 |
| DE | 102008024950 A1 | 11/2009 |
| EP | 1373993 B1 | 10/2006 |
| EP | 2123407 A2 | 11/2009 |
| EP | 1625918 B1 | 10/2011 |
| EP | 1801678 B1 | 2/2013 |
| WO | 2005118232 A2 | 12/2005 |

* cited by examiner

*Primary Examiner* — Khoi Tran
*Assistant Examiner* — Robert Nguyen
(74) *Attorney, Agent, or Firm* — Slater Matsil, LLP (57) ABSTRACT

A method and apparatus for failure handling of a robot having at least a first and a second movement axis are disclosed. In one embodiment the method includes receiving a first position information of the first movement axis for a first point of time and a first position information of the second movement axis for the first point of time and storing the received first position information as a motion data set, receiving a second position information of the first movement axis for a second point of time and a second position information of the second movement axis for the second point of time and storing the received second position information in the motion data set and controlling the robot according to a failure procedure.

25 Claims, 6 Drawing Sheets

METHOD AND APPARATUS FOR FAILURE HANDLING OF A ROBOT

TECHNICAL FIELD

Embodiments of the present invention refer to a method for failure handling of a robot, to a storage medium having stored thereon software enabling the failure handling and to a corresponding apparatus for failure handling. Further embodiments refer to a controller enabled for failure handling and to a robot comprising such a controller.

BACKGROUND

A robot is an electromechanical machine having at least one, but preferably multiple actuated joints such that same is enabled to perform manual tasks like manufacturing tasks. A special robot type which is often used for industrial applications is the so called articulated robots having a plurality of movement axes. Here, the movement axis may be arranged in series. The movement axis may be a flection axis, a linear displacement axis and/or a rotation axis. A particular form of an articulated robot is the so called kinematically redundant robot having more movement axes than degrees of freedom. Thus, a position of the robotic arm may be reached via multiple possible combinations of the axis positions.

In order to control a robot it typically comprises or is typically coupled to a robot controller. This robot controller controls the singular actors of the movement axis such that the robot can move from the start position to a further position along a predetermined trajectory (path of motion) and vice versa. This trajectory is the result of a combination of a sequence of movements of the multiple movement axes. However, in case of a failure, e.g., a clash of the robot with another object the failure handling procedure is rather complicated so that the failure handling procedure cannot be processed automatically. Background thereof is that the described robots are typically enabled for soft acting, i.e., that all movement axes are put to a forceless state in case of a clash. This soft acting enables to avoid damaging the robot or the clash object, wherein the end position of the robot (after the clash) is unknown because same is out of the known movement path. Therefore, there is the need for an improved approach.

SUMMARY OF THE INVENTION

Embodiments of the invention refer to a method for failure handling of a robot having at least a first and a second movement axis. The method comprises the step of receiving a first position information of the first movement axis for a first point of time and a first position information of the second movement axis for the first point of time. The received first position information is stored as a motion data set. Furthermore, the method comprises the step of receiving a second position information of the first movement axis for a second point of time and a second position information of the second movement axis for the second point of time. This received second position information is stored in the motion data set as well. The last step is controlling the robot according to a failure procedure if a robot failure, e.g., a clash, is detected. The failure procedure comprises triggering the robot to move the first and second movement axis to its second position and triggering the robot to move the first and second movement axis to its first position afterwards.

A further embodiment provides a computer readable digital storage medium having stored thereon a computer program having a program code for performing, when running on a computer, the above method for failure handling of the robot.

The further embodiment provides an apparatus for failure handling of a robot having at least a first and a second axis. The apparatus is configured to receive the position information of the first and the second movement axis of the robot, to store motion data using a memory and to control the robot if the robot causes a failure via control signals which are based on the stored motion data. The stored motion data comprises a first position information of the first movement axis for a first point of time, a second position information of the first movement axis for the second point of time, a first position information of the second movement axis for the first point of time and the second position information of the second movement axis for the second point of time. The control signals comprise a first control signal triggering the robot to move the first and second movement axis to its second position and a second control signal triggering the robot to move the first and the second movement axis to its first position. The first control signal is output before outputting the second control signal such that a robot moves to the second position before moving to the first position.

A further embodiment provides a controller for controlling a robot having at least a first and a second movement axis. The controller is configured to control the first and the second movement axis according to a control algorithm and is configured to store motion data using a memory and to control the robot if the robot causes a failure via control signals which are based on the stored motion data. The stored motion data comprises a first position information on the first movement axis for a first point of time, a second position information of the first movement axis for a second point of time, a first position information of the second movement axis for the first point of time and a second position information of the second movement axis for the second point of time. The control signals comprise a first control signal triggering the robot to move the first and the second movement axis to its second position and a second control signal triggering the robot to move the first and the second movement axis to its first position. The first control signal is output before outputting the second control signal such that the robot moves the second position before moving to the first position.

According to a further embodiment a robot comprises a first movement axis, a second movement axis and a controller for controlling the first and the second movement axis. Furthermore, the robot comprises an apparatus for failure handling, the apparatus is configured to store motion data using a memory and to control the robot if the robot causes a failure via control signals which are based on the stored motion data. The stored motion data comprises a first position information of the first movement axis for a first point of time, a second position information of the first movement axis for a second point of time, a first position information of the second movement axis for the first point of time and a second position information of the second movement axis for the second point of time. The control signals comprise a first control signal triggering the robot to move the first and the second movement axis to its second position and the second control signal triggering the robot to move the first and the second movement axis to its first position. The first control signal is output before outputting the second control signal such that the robot moves to the second position before moving to the first position.

BRIEF DESCRIPTION OF THE DRAWINGS

Below, embodiments of the present invention will subsequently be discussed referring to the enclosed drawings.

Below, embodiments of the present invention will be discussed in detail referring to the figures, wherein same reference numerals are provided to objects or elements having an identical or similar function so that the description thereof is interchangeable or mutually applicable.

DETAILED DESCRIPTION OF ILLUSTRATIVE EMBODIMENTS

FIG. 1 shows a block diagram of a method 100 comprising at least three basic steps 110, 120 and 130. The step 110 refers to a step of receiving a first position information of the first movement axis for a first point of time and receiving a first position information of a second movement axis for the same point of time. For example, the respective first position information for the two movement axis may comprise an angle value of the first movement axis and a further angle value for the second movement axis. The position information may be provided by a robot controller or may be read out from a sensor system of the robot. These two substeps of receiving the two position information (of the first and second axes) are aggregated to a common step because the two first position information (or, in general, position information indicating the position of the movement axes for the same point of time) are typically provided contemporaneously. This first position information is stored as motion data in a motion data set. The next step 120 is similar to the step 110, but has the purpose to collect the position information of the first and second movement axis for a second (further) point of time afterwards. This point of time is preferably selected such that the robot has performed a movement during the period of time from the first point of time to the second point of time. During this step 120 the second position information for the first and second movement axis and for the second point of time is also stored in the motion data set. Thus, the motion data set comprises position information for the robot for at least two different points of time so that the trajectory of a robot is reconstructible.

Figure 1A:
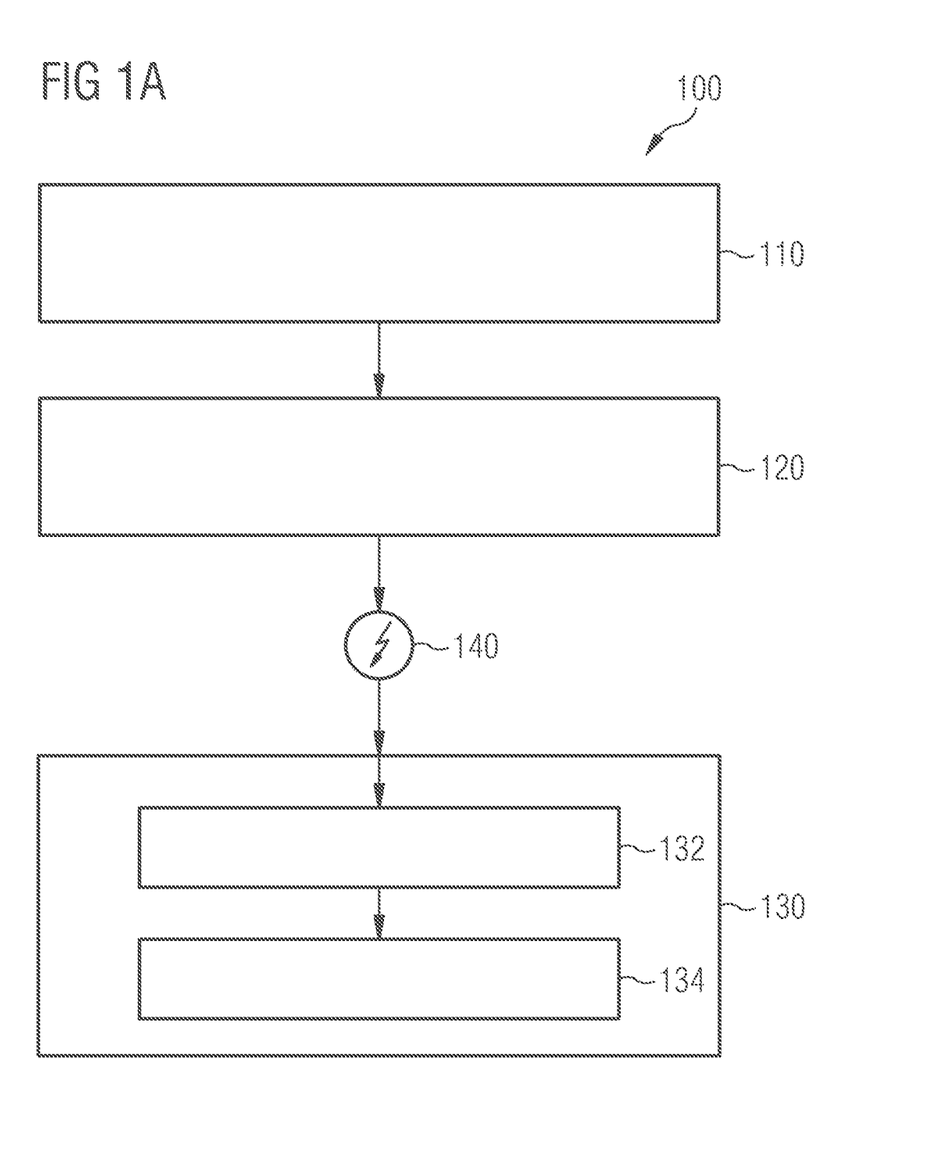
FIG. 1a shows a flowchart of a method for failure handling of a robot according to a first embodiment.

The last basic step of the method 100 (after collecting the singular position information or after collecting the motion data) is the step 130. This step of controlling the robot according to a failure procedure is performed just in case of a detected failure. This dependency is illustrated by the point 140 arranged between the steps 120, 130. The detection of the failure may be the task of the robot which typically has a collision sensor or a collision sensing system. After the detection of the failure 140 the method provides the failure handling procedure 130 which comprises at least two substeps 132 and 134 which are performed in sequence. The first procedure substep 132 triggers the robot to move the first and second movement axis to its second (last) position (cf. step 120). That is, the robot is controlled such that same moves to the last known or last safe position, or expressed in other words to the position before detecting the failure. After performing this substep 132 the robot is in the second position, or to be precise all moving axes are in their second position. The subsequent substep is the step 134 of triggering the robot to move the first and second movement axis to its first position, e.g., to the start position of the robot. The result is that the robot was enabled to automatically return to the start position of the robot in case of a failure. This embodiment was explained on the assumption that just two positions have been recorded during the trajectory before failing.

According to further embodiments, the method 100 may comprise further steps of receiving a further position information of the first movement axis for a further point of time and a further position information of the second movement axis for the further point of time and storing the received further position information in the motion data set such that the trajectory may be recorded more accurately. These optional further steps may be arranged between the step 120 and the failing event 140. According to this embodiment the failure handling procedure 130 may also comprise further steps of triggering the robot to move the first and second movement axis to its further positions, wherein these optional further steps are arranged before the step 132, i.e., between the failing event 140 and the triggering step 132.

According to a further embodiment, the above described method may be enhanced with respect to the complexity of the robot, as will be described below.

Figure 1B:
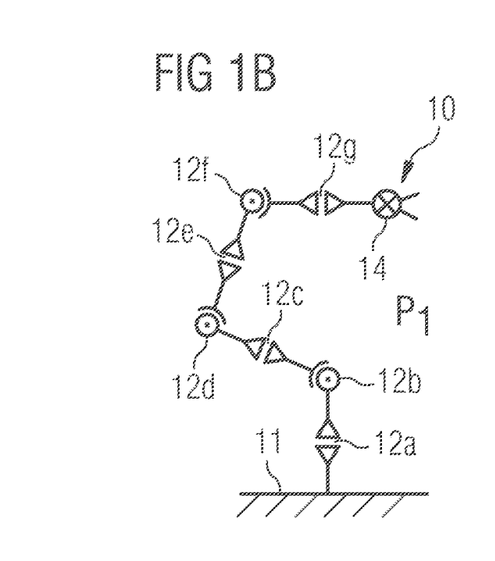
FIGS. 1b-1d show a motion sequence of an exemplary robot.

FIG. 1b shows schematically an articulated robot arm 10 comprising seven joints 12a to 12g, wherein the place of location of the robot arm 10 is marked by the reference numeral 11 (fix position 11). The seven joints 12a to 12g are arranged serial kinematically, wherein a so called tool center point 14 is coupled to the last joint 12g. The illustrated robot 10 has two different types of joints, namely the joints 12a, 12c, 12e and 12g performing a rotation around a movement axis which extends along the respective segment of the articulated arm 10. The joints 12b, 12d and 12f are configured to perform an angular movement. All in all, the robot 10 has more movement axes than dimensions. Thus, the illustrated robot 10 belongs to the group of so called kinematically redundant robots.

The robot 10 illustrated by FIG. 1b is arranged in the first position P1, wherein the first position is a combination of first positions of the singular joints 12a to 12g. Here, each first position of the joints 12a to 12g may be described by a value, e.g., a value of rotation or an angle value of flection. That is, the first position of the robot may be described by absolute values of the single movement axes 12a to 12g.

Figure 1C:
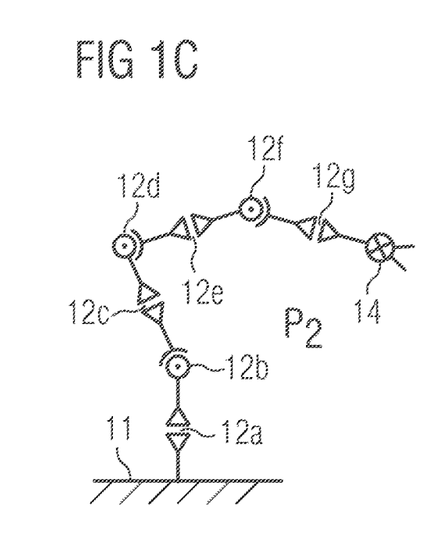
Figure 1D:
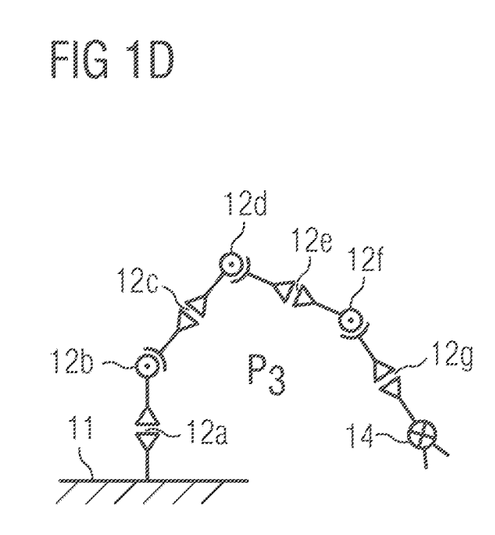

In order to illustrate this relationship in detail, FIGS. 1c and 1d show the same robot 10 in different positions P2 and P3 when compared to the first position P1. In the second position P2 the joints 12b and 12f are changed when compared to the first position P1. The third position P3 differs from the second position P2 with respect to the positions of the joints 12b and 12d. Due to the sequential and/or parallel movement of the joints 12b, 12d and 12f along the respective movement axes 12a-12g the tool center point 14 is moved along a trajectory starting from the position P1 to the position P3.

Figure 1E:
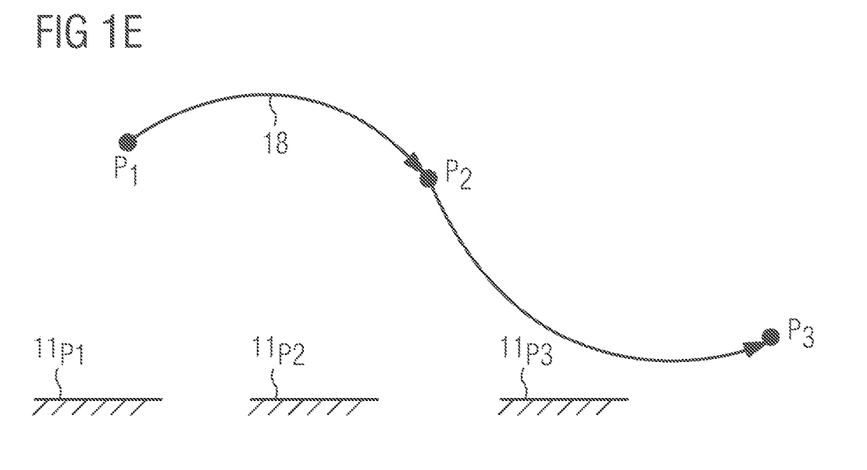
FIG. 1e shows a trajectory (in a forward direction) of the robot performing the motion as illustrated by FIGS. 1b to 1d.

This trajectory 18 is illustrated by FIG. 1e. In the diagram of FIG. 1e, the respective places of location $11_{P1}$, $11_{P2}$ and $11_{P3}$ are illustrated relative to the positions P1, P2 and P3. The trajectory 18 as shown in FIG. 1e has a wave shape, wherein this trajectory 18 results from a combination of different movements of the different joints 12a to 12g, as described above. From another point of view, this means that the position of the tool center point 14 may be described as a combination of the position information of the singular joints 12a to 12g. This kind of position information has the advantage, especially in comparison to a position information given by using just Cartesian coordinates of the tool center point 14, that even the posture position of the entire robot 10 is describable for the kinematically redundant system. Background thereof is that, in case of a kinematically redundant system, there are typically pluralities of different combinations of the positions of the singular joints 12a to 12g in order to position the TCP 14 to a certain position in the 3-dimensional space. Consequently, there are also multiple solutions to move the robot from the position P1 to the position P3 or vice versa. Therefore, it is a common approach to predefined a trajectory from the start position (e.g., P1) to the end position of the tool center point 14 (e.g., from the position P3) and back to the start position P1. However, in case of a failure, for example clash of the robot 10, the robot 10 stops in a undefined position somewhere in between.

In order to enable the automatic return of the robot 10 to the start position P1 the intermediate positions of the robot 10 are recorded during the motion along the trajectory 18 (cf. FIG. 1e) according to the basic method illustrated by FIG. 1a. The result of the trajectory recording is illustrated by the following table:

TABLE 1

|    | 12a | 12b | 12c | 12d | 12e | 12f | 12g |
|----|-----|-----|-----|-----|-----|-----|-----|
| t1 | 43.382° | 97.33° | 162.352° | −0.17° | −63.55° | 19.55° | 117.19° |
| t2 | 43.382° | 101.22° | 162.352° | −2.33° | −63.55° | 17.2° | 117.19° |
| t3 | 43.382° | 105.669° | 162.352° | −9.195° | −63.55° | 15.49° | 117.19° |
| t4 | 43.382° | 110.5° | 162.352° | −16.741° | −63.55° | 12.98° | 117.19° |
| t5 | 43.382° | 113.76° | 162.352° | −19.96° | −63.55° | 10.45° | 117.19° |
| ... | ... | ... | ... | ... | ... | ... | ... |

The table, also referred to as motion data set, represents the (numerical) recording of the trajectory 18, wherein the recording is based on a plurality of snapshots (here: five or more snapshots) for different point of times t1 to tn (here: t5). Each position for the respective point of time t1 to t5 comprises seven absolute values for the seven joints 12a to 12g. It should be noted that the absolute values of this embodiment are provided by using the unit degree. It is clear that the number of recorded point of times per time unit has a direct influence on the reconstruction of the trajectory of the robot. Consequently, this means that the higher number of recorded point of times per time unit leads to a better resolution for the trajectory recording. The values to be recorded are typically available from the controller of the robot or from the robot itself. The values may be provided by the robot or the robot controller separately for each movement axis or as combined data set. According to a common industrial approach the position information or movement information is provided by using a data type comprising all values of the kinematical movement. That means that the values to be recorded are easily readable from the robot controller or the robot. Preferably, a complete motion data set may be read out from the robot controller or the robot.

Figure 1F:
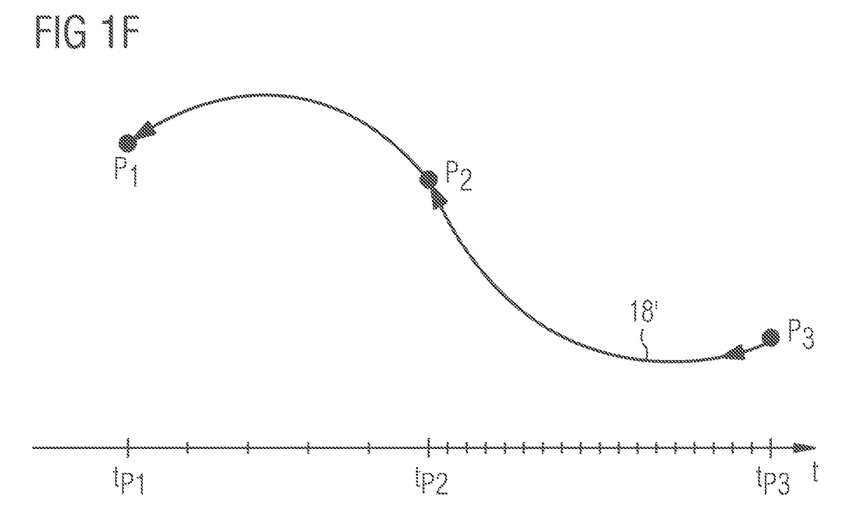
FIG. 1F shows a return trajectory (in a backward direction) of the robot of FIGS. 1b to 1d according to a failure handling procedure.

Based on the recorded data set comprising the plurality of position information for the plurality of point of times, the robot can be controlled such that same regresses along the trajectory, (cf. FIG. 1e) i.e., along the backwards trajectory as illustrated by FIG. 1f. Figure if illustrates the backwards trajectory 30' for the TCP 14 for the failure handling procedure. Here, the x-axis of the diagram belongs to the time domain t. The time axis comprises a plurality of marks, each assigned to a point of time of a recording of the movement position of the respective movement axis. The three points of time $t_{P1}$, $t_{P2}$ and $t_{P3}$ for the three positions P1, P2 and P3 are marked with the respective reference numerals. In the backwards directory the tool center point is moved from the point P3 to the point P1 over the intermediate point P2. For this movement the singular positions as stored by the data set (cf. above table) are read out backwards. This backward reading out of the recorded motion data set is illustrated by the following table:

TABLE 2

|    | 12a | 12b | 12c | 12d | 12e | 12f | 12g |
|----|-----|-----|-----|-----|-----|-----|-----|
| ... | ... | ... | ... | ... | ... | ... | ... |
| t6 | ... | ... | ... | ... | ... | ... | ... |
| t5 | 43.382° | 113.76° | 162.352° | −19.96° | −63.55° | 10.45° | 117.19° |
| t4 | 43.382° | 110.5° | 162.352° | −16.741° | −63.55° | 12.98° | 117.19° |
| t3 | 43.382° | 105.669° | 162.352° | −9.195° | −63.55° | 15.49° | 117.19° |
| t2 | 43.382° | 101.22° | 162.352° | −2.33° | −63.55° | 17.2° | 117.19° |
| t1 | 43.382° | 97.33° | 162.352° | −0.17° | −63.55° | 19.55° | 117.19° |

Due to the fact that the recorded positions of the movement axis form the basis for the return path 18' this described failure handling procedure may also be used in case of a new predefined path 18. From our point of view that means that the failure handling procedure does not have to be changed in case of a new predefining of the trajectory 30.

The above description was made on the assumption that the velocity and thus the acceleration of the movements of the joints are not constant. However, according to a further embodiment the recording of the motion data comprises the recording of the velocity Δv and/or of the acceleration for each movement axis. This enables to drive the robot with the same (inverted) motion backwards (when compared to the forward direction) especially in case of a varying velocity. Thus, according to this embodiment the controller controls the robot such that the singular positions are achieved using the stored velocity Δv and/or the stored acceleration. This approach is especially advantageous in case of a highly varying velocity resulting in varying distances Δx.

Below, the interaction of a controller performing the recording and the failure handling and the regular robot controller will be discussed with respect to FIGS. 2a and 2b, wherein further embodiments of the failure handling will be discussed with respect to FIGS. 3a, 3b, 4a, 4b and 4c.

Figure 2A:
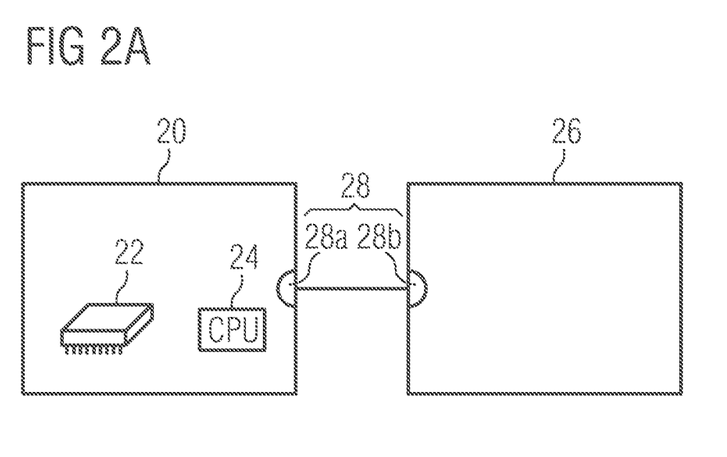
FIG. 2a shows a block diagram of an apparatus for failure handling according to an embodiment.

FIG. 2a shows a controller for failure handling 20 which comprises at least a memory 22 and a CPU 24. The controller 20 is coupled to the further controller for the robot 26 which has the purpose of controlling the movement of the robot. Therefore, the failure handling controller 20 and the robot controller 26 may be coupled via an interface 28 comprising first interface part 28a (of the controller 20) and a second interface part 28b (of the controller 26). Via this interface 28 data may be exchanged between the two controllers 20 and 26 in order to receive the position information from the controller 26 and to output control signals to the controller 26 for a failure handling procedure. The memory 22 of the failure handling controller 20 is configured to store the position information received from the controller 26, wherein the CPU 24 is configured to analyze the received position information and to control the storing of the position information, e.g., varying the temporal resolution. Furthermore, the CPU 24 detects or determines a failure and controls the robot via the controller 26 based on the stored data in case of a failure.

It is illustrated by the topology of the two controllers 20 and 26 that the controller 20 may be an autonomously processing unit; thus, the controller 20 may be designed as a retrofit component.

Figure 2B:
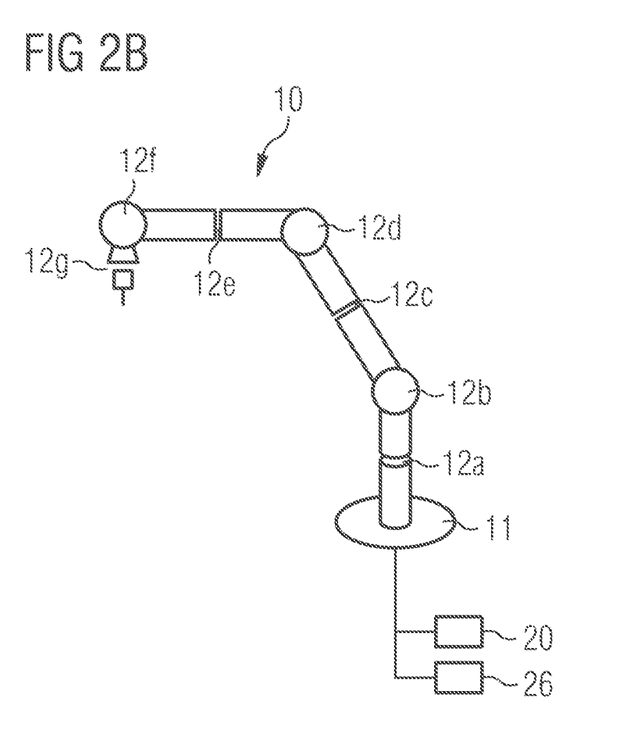
FIG. 2b shows a block diagram of robot comprising a controller and an apparatus for failure handling according to a further embodiment.

According to further embodiments the controller may be directly coupled to the robot as illustrated by FIG. 2b. FIG. 2b shows the robot 10 coupled to the robot controller 26 and to the controller for failure handling 20. Alternatively, the two controllers 20 and 26 may be combined to a control unit performing the operation controlling and the failure handling.

Figure 3A:
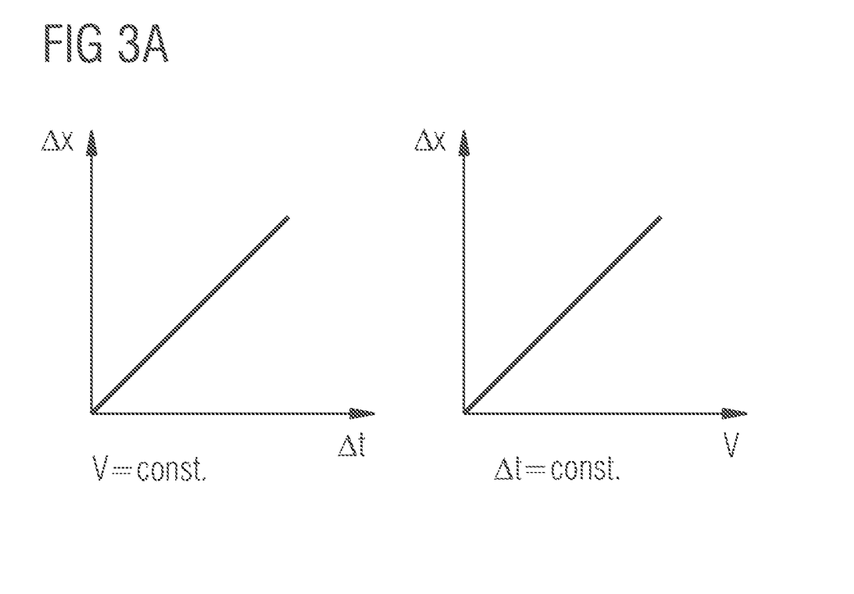
FIGS. 3a and 3b show two diagrams describing the motion of a robot for illustrating two different modes of adapting the number of stored positions of the robot.
Figure 3B:
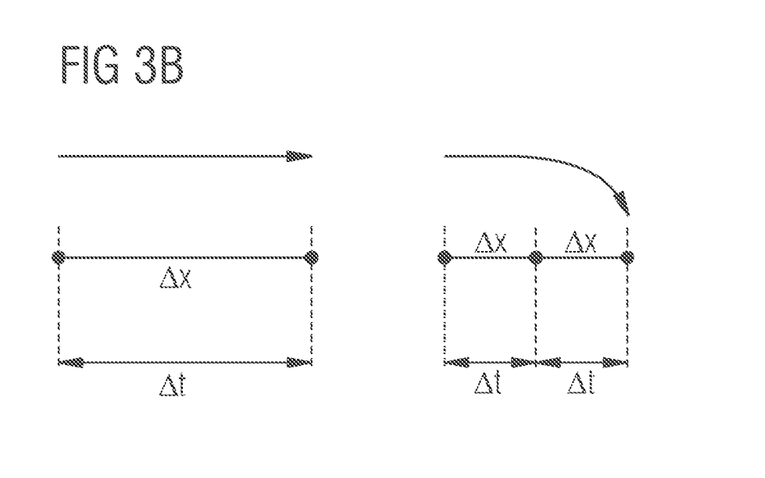

With respect to FIGS. 3a and 3b an embodiment enabling to vary the temporal resolution will be discussed. Starting from the diagram of FIG. 1f, it becomes clear that the variance of the temporal resolution enables to vary the sampling resolution of the trajectory 18. The time axis of Figure if shows a plurality of marks, each assigned to a point of time of recording. As can be seen the number of recordings between the points $t_{P2}$ and $t_{P3}$ is increased when compared to the number of marks between the points $t_{P1}$ and $t_{P2}$. This increase of the temporal resolution is preferably made in case of a high movement velocity. FIG. 3a illustrates the dependency of the distance traveled Δx, the time slot Δt and the velocity v.

In detail, FIG. 3a shows two diagrams, wherein the first diagram illustrates that an increasing time difference Δt between two recordings leads to an increased distance traveled Δx when the velocity v (of the TCP) is constant. The second diagram illustrates that an increased velocity v (of the TCP) leads to a higher resulting distance traveled Δx per time unit (Δt) when the time span Δt stays unchanged. A preferred way to define the time slots Δt is to adapt same based on the maximum velocity. A further way is to select the time slot Δt such that the distance traveled Δx is sufficiently small in case of a curve trajectory and increased when the trajectory is straight. Background thereof is that it is a common goal to reduce the number of recordings in order to reduce the CPU load of the robot controller or of the interrupt system. This strategy is illustrated by FIG. 3b.

Figure 4A:
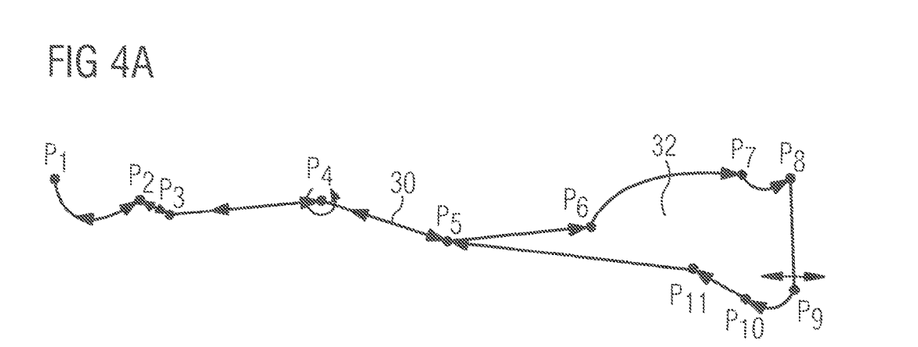
FIGS. 4a-4c show diagrams of a trajectory of a robot for illustrating the failure handling according to an enhanced embodiment.

Below, a further embodiment will be discussed with respect to FIG. 4. FIG. 4a shows an exemplary trajectory 30 in an assembly process, the trajectory comprising eleven predefined positions for the TCP. Each position P1 to P11 complies with a turning point of the TCP, i.e., with a change of the motion direction of the TCP. As discussed above, the motion of the TCP and thus the change of the motion direction results from a combination of different movements of the plurality of joints of the robot. The below discussion is made with respect to the trajectory 30 of the TCP representing a combination of the movements of the different joints. The trajectory of the robot or the plurality of independent movements resulting in the trajectory is defined during an initial setup. During the setup a plurality of different trajectories, e.g., the trajectory 30 for different assembly processes, may be defined. Here, the points P1 to P4 are so called global points which are used for each of the different trajectories, wherein the point P1 is the starting point of the robot. The point P4 may be the point at which a work piece is turned into a horizontal position. The points P5 and P6 are manufacturing process specific and thus may vary dependent on the selected manufacturing program. The point P9 is a so called strategic point of the trajectory 30 at which the gripper attached to the tool center point is opened in order to deposit the work piece (illustrated by the arrow). The points P7 and P8 are dependent on the point P9; therefore, the positions P7 and P8 may also be referred to as dynamic positions or respective positions. These dynamic positions have the advantage that a displacement of the position P9 also leads to a displacement of the previous positions P7 and P8. The points P10 and P11 (after the deposition of the work piece) define the path of the TCP out of the working area and are also dynamic positions dependent on the position P9. The dependency is stored during the so called teaching process during the initial setup. Note that this motion path via the points P10 and P11 is typically passed without the work piece. The point P11 and P5 of the trajectory, the TCP returns to the position P1 directly from the point P11 via the points P5, P4, P3 and P2 without passing the points P10, P9, P8, P7 and P6. Such a trajectory enables that the area 32 enclosed by the trajectory 30 from P5 to P5 is not crossed by the TCP, so the area 32 may be reserved for another object like another robot.

Figure 4B:
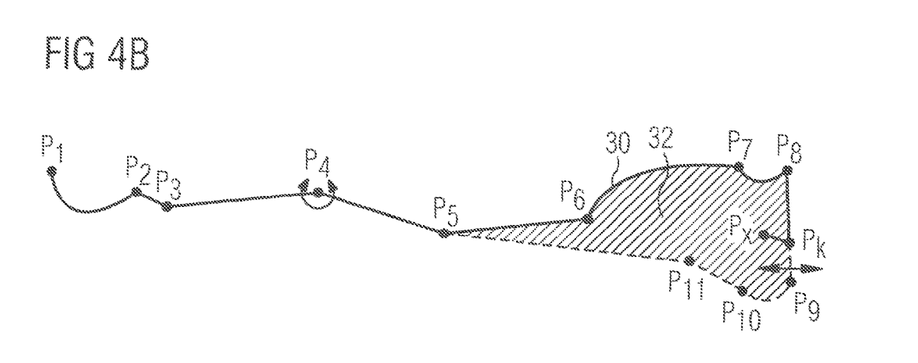

FIG. 4b illustrates a clash of the TCP at the trajectory 30. The clash happened at a point $P_k$ between the points P8 and P9. The clash is detectable via an integrated function of the robot which enables to switch the robot into the soft acting mode. This mode stops the robot intermediately and activates a forceless mode for each joint in order to avoid damaging the robot, the collision object or the work piece. However, due to the soft acting the position $P_x$ after the clash is out of the predefined trajectory 30. Added to this, the collision object may eventually be within the trajectory 30, e.g., at the point $P_k$ of the trajectory 30. Therefore, there is a need to control the robot such that same returns to the start position P1 without colliding the object (cf. position $P_k$) again.

Figure 4C:
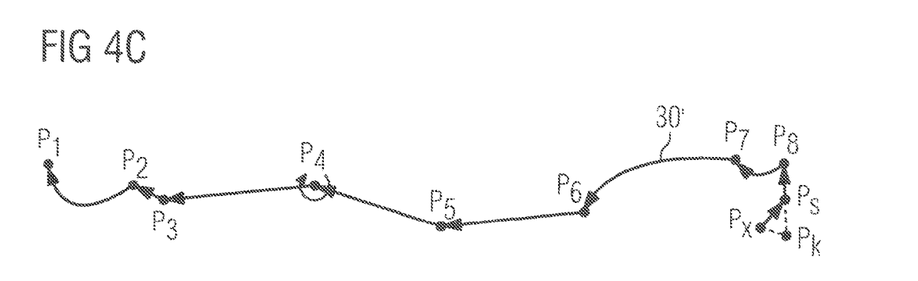

Here, some binaries for the return path are given: for example, the area 32 may not be crossed. Furthermore, due to the fact that the work piece has not been released the TCP cannot use the trajectory portion comprising the points P10 and P11. Therefore, the preferred approach is to return to the position P1 via the trajectory points P8, P7, P6, P5, P4, P3 and P2, i.e., via the recorded path, as illustrated by FIG. 4c.

In order to avoid a further clash at the point $P_k$ the failure handling controller controls the robot such that the TCP returns not to the last recorded position, but to the last known safe position $P_s$, e.g., the position lying on the trajectory 30 before the point of the clash $P_k$ (i.e., between the point $P_8$ and $P_k$). The exact position of the point $P_s$ depends on the temporal resolution of the recording. As discussed above, the robot is controlled such that same moves along the trajectory 30' in a backward direction starting from the point $P_s$ or $P_x$ and the point $P_1$.

Referring to FIG. 4b it should be noted that the recording of the trajectory 30 may be stopped after passing a strategic point, like the point P9 (TCP-position at which the gripper is opened in order to release the work piece) so that the return path after passing this strategic point may comply with a portion of the predefined trajectory 30 comprising the points P10, P11, P5, P4, P3, P2 and P1. Consequently, that means, that a clash after the point P9 leads to a failure handling procedure not being based on the recorded position information. Background thereof is that it can reasonably be assumed that the trajectory 30 in the area of the release point P9 may be occupied by the work piece or another robot handling the work piece. Therefore, according to further embodiments the method may comprise the step of stop the recording when passing a predefined strategic position of the trajectory 30. In such cases the failure handling procedure may be performed such that the TCP is moved along the forward direction back to the predetermined trajectory 30.

Referring to the embodiment of FIG. 1 it should be noted that the motion data set illustrated by the tables may be enlarged by using interpolation calculations. This interpolation may, for example, be done during the failure handling procedure and thus when the TCP is moved along the backward trajectory.

Referring to FIG. 1a it should be noted that collision sensing system may, for example, be based on a analyzing of the torque levels of the singular movement axes. Background thereof is that a deviation (e.g., larger than +10% or +5%) of the measured or determined torque level from the regular (known) torque level indicates a collision. The determination of the torque level may be done by analyzing the motor currents of the joint actors for the respective movement axes.

Referring to FIG. 2a it should be noted that the control signals output by the failure handling controller 20 may be processed by the controller 26 such that the control signals output by the failure handling control 20 are combined with the standard control signal of the controller 26. This enables a smooth motion of the TCP.

Referring to FIG. 4 it should be noted that some points, e.g., the points P1, P2, P3 or P4 may be defined as global positions also for the failure handling procedure. Defining such global positions for the failure handling procedure enables that the return trajectory 30' is congruent with the forward trajectory 30. Typically, at least the start position P1 is defined as such a global point. Here, it may be advantageous to store the global points independently from the recorded points.

With respect to FIGS. 1b-1f, it should be noted that the numerical recording of the singular movement positions of the entire robot or of the plurality of movement axes may be stored in a comparable format as illustrated by the above table. Furthermore, it should be noted that the stored values (value of rotation, angle value of flection and/or value of linear displacement) may be absolute values (e.g., angle between two robot arm segments) or may be values dependent on the absolute values.

Although aspects of embodiments of the invention have been described for an articulated arm robot (robot having a serial kinematic) these aspects or the entire method for failure handling may also be used for robots having a different shape, like a robot having a parallel kinematic (cf. humanoid robot) or a Stewart platform (cf. hexapod) or for another automatized device. Furthermore, the number of joints and thus the number of movement axes is not limited, so, in general, the number may be n, with n≥1.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example, a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A method for failure handling of a robot having at least a first movement axis and a second movement axis, the method comprising:
    recording a trajectory of the robot during operation, wherein recording comprises:
        receiving, during the operation, a first position information of the first movement axis for a first point of time and a first position information of the second movement axis for the first point of time and storing the received first position information as a motion data set; and
        receiving, during the operation, a second position information of the first movement axis for a second point of time and a second position information of the second movement axis for the second point of time and storing the received second position information in the motion data set; and
    controlling the robot according to a failure procedure if a robot failure is detected, the failure procedure comprising:
        triggering the robot to move the first and second movement axes to second positions of the first and second movement axes; and
        triggering the robot to move the first and second movement axes to first positions the first and second movement axes.

2. The method according to claim 1, wherein the robot has a plurality of movement axes;
    wherein receiving and storing the first position information of the first movement axis and of the second movement axis comprises receiving and storing first position information of further movement axes of the plurality of movement axes; and
    wherein receiving and storing the second position information of the first movement axis and of the second movement axis comprises receiving and storing second position information of the further movement axes.

3. The method according to claim 1, further comprising:
    a method step of receiving a third position information of the first movement axis for a third point of time and a third position information of the second movement axis for the third point of time and storing the received third information in the motion data set after receiving and storing the second position information; and
    a procedure step of triggering the robot to move the first and second movement axes to the third positions before triggering the robot to move the first and second movement axes to the second positions.

4. The method according to claim 3, wherein a time difference between the first point of time and the second point of time is equidistant to a time difference between the second point of time and the third point of time.

5. The method according to claim 1, wherein a time difference between the first point of time and the second point of time is adapted dependent on at least one of a velocity of a first moving axis and a velocity of a second moving axis.

6. The method according to claim 5, wherein the time difference is reduced if at least one of the velocity of the first moving axis and the second moving axis is high, or wherein the time difference is enlarged if at least one of the velocity of the first moving axis and the second moving axis is high.

7. The method according to claim 1, wherein the first position information and the second position information are stored in the motion data set as absolute values for a first moving axis and a second moving axis.

8. The method according to claim 1, wherein the first position information and the second position information are stored in the motion data set as values for a first moving axis and a second moving axis, and wherein at least one of the values is out of the group consisting of a value of rotation, an angle value of flection and a value of linear displacement.

9. The method according to claim 1, further comprising:
a method step of receiving a first velocity information of the first movement axis for a period of time between the first point of time and the second point of time and a first velocity information of the second movement axis for the period of time between the first point of time and the second point of time and storing the received first velocity information in the motion data set; and
a procedure step of controlling the robot to move the first and second movement axes from the second positions of the first and second movement axes to the first positions of the first and second movement axes with respective velocities according to the stored first velocity information.

10. The method according to claim 1, further comprising:
a method step of receiving a first acceleration information of the first movement axis for a period of time between the first point of time and the second point of time and a first acceleration information of the second movement axis for the period of time between the first point of time and the second point of time and storing the received first acceleration information in the motion data set; and
a procedure step of controlling the robot to move the first and second movement axes from the second positions of the first and second movement axes to the first positions of the first and second movement axes with respective inverted accelerations according to the stored first acceleration information.

11. The method according to claim 1, wherein at least one position of the first and second movement axes is predefined for a point of time predefined relative to at least one of the first and second point of time, and wherein the failure procedure comprises triggering the robot to move the first and second movement axes to the predefined position.

12. The method according to claim 11, wherein the predefined position is defined by Cartesian coordinates in a space.

13. The method according to claim 11, wherein the predefined position is a start position of the robot.

14. The method according to claim 11, wherein the predefined position is a last recorded position without failure.

15. The method according to claim 14, wherein triggering the robot to move the first and second movement axes to the predefined position is performed such that a position, at which the failure has been detected, is bypassed.

16. The method according to claim 1, wherein the detected failure is a clash of the robot which is configured to perform a soft acting procedure in case of the clash.

17. The method according to claim 1, wherein the steps of triggering the robot to move the first and second movement axes to the second positions of the first and second movement axes and the first positions of the first and second movement axes comprise sub steps of outputting control signals to or via a control unit of the robot, and wherein the control signals are post-processed by the control unit in order to enable the robot to move according to a robot specific movement profile.

18. The method according to claim 1, wherein the motion data set is stored in a table having a first dimension for the respective movement axes and a second dimension for the respective point of times.

19. A non-transitory computer readable digital storage medium having stored thereon a computer program having a program code for performing, when running on a computer, a method for failure handling of a robot having at least a first movement axis and a second movement axis, the method comprising:
recording a trajectory of the robot during operation, wherein recording comprises:
receiving, during the operation, a first position information of the first movement axis for a first point of time and a first position information of the second movement axis for the first point of time and storing the received first position information as motion data set; and
receiving, during the operation, a second position information of the first movement axis for a second point of time and a second position information of the second movement axis for the second point of time and storing the received second position information in the motion data set; and
controlling the robot according to a failure procedure if a robot failure is detected, the failure procedure comprising:
triggering the robot to move the first and second movement axes to second positions of the first and second movement axes; and
triggering the robot to move the first and second movement axes to first positions of the first and second movement axes.

20. An apparatus for failure handling of a robot having at least a first movement axis and a second movement axis, wherein the apparatus comprises a processor for controlling the robot, wherein the apparatus comprises a first interface for receiving position information and a second interface for controlling the robot, and wherein the apparatus is configured to:
record a trajectory of the robot during operation by receiving a position information of the first and the second movement axes of the robot;
store motion data using a memory; and
control the robot if the robot causes a failure via control signals which are based on the stored motion data,
wherein the stored motion data comprise a first position information of the first movement axis for a first point of time during the operation, a second position information of the first movement axis for a second point of time during the operation, a first position information of the second movement axis for the first point of time during the operation and a second position information of the second movement axis for the second point of time during the operation,
wherein the control signals comprise a first control signal triggering the robot to move the first and second movement axes to second positions of the first and second movement axes and a second control signal triggering the robot to move the first and second movement axes to first positions of the first and second movement axes, and
wherein the first control signal is output before outputting the second control signal such that the robot moves to the second positions of the first and second movement axes before moving to the first positions of the first and second movement axes.

21. The apparatus according to claim 20, wherein the apparatus comprises the memory configured to store and to provide the motion data set.

22. A controller for controlling a robot having at least a first movement axis and a second movement axis, wherein the controller comprises a processor for controlling the robot, and wherein the controller is configured to:
control the first and the second movement axes according to a control algorithm;
record a trajectory of the robot during operation;
store motion data using a memory; and
control the robot if the robot causes a failure via control signals which are based on the stored motion data,
wherein the stored motion data comprise a first position information of the first movement axis for a first point of time during the operation, a second position information of the first movement axis for a second point of time during the operation, a first position information of the second movement axis for the first point of time during the operation and a second position information of the second movement axis for the second point of time during the operation,
wherein the control signals comprise a first control signal triggering the robot to move the first and second movement axes to second positions of the first and second movement axes and a second control signal triggering the robot to move the first and second movement axes to first positions of the first and second movement axes, and
wherein the first control signal is output before outputting the second control signal such that the robot moves to the second positions of the first and second movement axes before moving to the first positions of the first and second movement axes.

23. A robot comprising:
a first movement axis;
a second movement axis;
a controller for controlling the first and second movement axes; and
an apparatus for failure handling, the apparatus being configured to record a trajectory of the robot during operation, to store motion data using a memory and to control the robot if the robot causes a failure via control signals which are based on the stored motion data,
wherein the stored motion data comprise a first position information of the first movement axis for a first point of time during the operation, a second position information of the first movement axis for a second point of time during the operation, a first position information of the second movement axis for the first point of time during the operation and a second position information of the second movement axis for the second point of time during the operation,
wherein the control signals comprise a first control signal triggering the robot to move the first and second movement axes to second positions of the first and second movement axes and a second control signal triggering the robot to move the first and second movement axes to first positions of the first and second movement axes, and
wherein the first control signal is output before outputting the second control signal such that the robot moves to the second positions of the first and second movement axes before moving to the first positions of the first and second movement axes.

24. The robot according to claim 23, wherein the robot comprises more movement axes than degrees of freedom.

25. The robot according to claim 23, wherein the apparatus for failure handling is embedded into the controller.

* * * * *